(12) United States Patent
Arie et al.

(10) Patent No.: US 6,582,340 B1
(45) Date of Patent: Jun. 24, 2003

(54) LOADING OPERATION VEHICLE

(75) Inventors: Nobuyuki Arie, Omiya (JP); Yasuhiko Nozawa, Kawazima-machi (JP); Katsuyuki Morimoto, Kawagoe (JP)

(73) Assignee: Komatsu Ltd., Tokyo (JP)

(*) Notice: Subject to any disclaimer, the term of this patent is extended or adjusted under 35 U.S.C. 154(b) by 60 days.

(21) Appl. No.: 09/716,585

(22) Filed: Nov. 20, 2000

(30) Foreign Application Priority Data

Nov. 19, 1999 (JP) ............................................. 11-330424

(51) Int. Cl.$^7$ .......................... F16H 59/60; B60K 41/04
(52) U.S. Cl. ......................................... 477/97; 477/111
(58) Field of Search ........................ 477/68, 111, 121, 477/122

(56) References Cited

U.S. PATENT DOCUMENTS

| | | | | |
|---|---|---|---|---|
| 4,125,039 A | * | 11/1978 | Helm | 477/111 |
| 4,699,021 A | * | 10/1987 | Waddington | 477/68 X |
| 4,727,490 A | * | 2/1988 | Narita et al. | 477/68 X |
| 4,953,427 A | * | 9/1990 | Ushiro | 477/68 |
| 5,109,730 A | * | 5/1992 | Zahn et al. | 477/121 |
| 5,406,483 A | * | 4/1995 | Kallis et al. | 477/11 X |
| 5,493,938 A | * | 2/1996 | Park | 477/68 X |

FOREIGN PATENT DOCUMENTS

| | | | | |
|---|---|---|---|---|
| JP | 404274934 | * | 9/1992 | 477/68 |
| JP | 07-103593 B2 | | 11/1995 | |

* cited by examiner

*Primary Examiner*—Richard M. Lorence
*Assistant Examiner*—Roger Pang
(74) *Attorney, Agent, or Firm*—Sidley Austin Brown & Wood LLP (57) ABSTRACT

A loading operation vehicle can reduce a specific fuel consumption during a traveling time and can improve operability of a driving characteristic. The vehicle is provided with output characteristic changing means (38, 48) for changing an output characteristic of an engine (1) in a plurality of stages, shift timing changing means (39) for changing a shift timing of an automatic transmission (9) in a plurality of stages, working machine flow amount changing means (32, 50) for changing a working machine flow amount of a pressurized oil flowing through a working machine actuator (42) in a plurality of stages, mode setting means (40) for combining the output characteristic of the engine, the shift timing of the automatic transmission and the set value of the working machine flow amount with each other so as to set a plurality of modes, and mode selecting means (45) for freely selecting from the modes.

7 Claims, 4 Drawing Sheets

LOADING OPERATION VEHICLE

FIELD OF THE INVENTION

The present invention relates to a loading operation vehicle which can properly set a drive mode at an operating time and a traveling time.

BACKGROUND OF THE INVENTION

Figure 4:
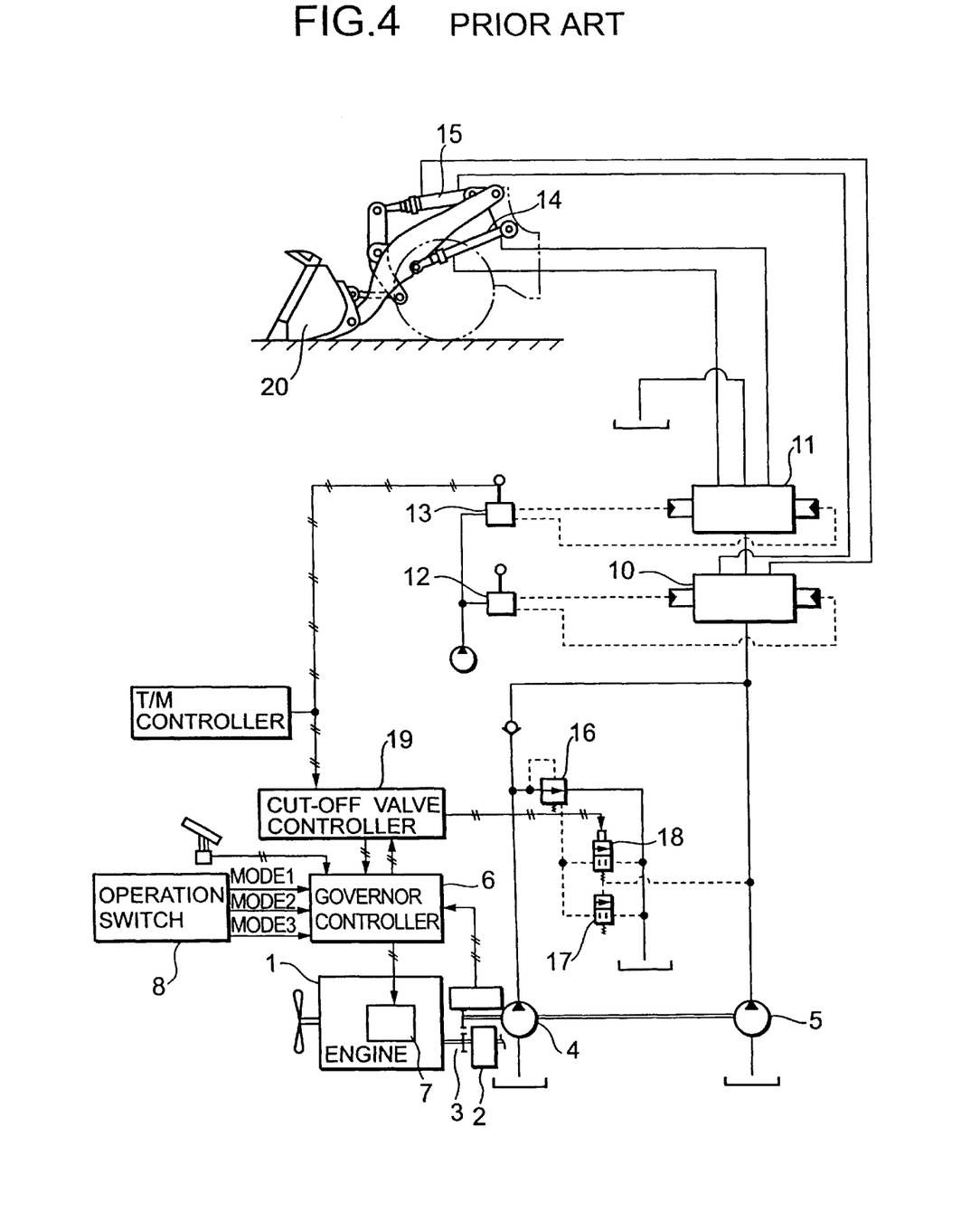
FIG. 4 is a control block diagram of a loading operation vehicle in accordance with a conventional art.

Conventionally, in a loading operation vehicle provided with a plurality of hydraulic pumps, there has been known a technique of selecting a combination obtained by changing an output characteristic of an engine and a cut-off condition of a hydraulic pump step by step in accordance with a magnitude of an operation load so as to improve a specific fuel consumption, and this technique is shown, for example, in Japanese Patent Publication No. 7-103593. FIG. 4 shows a control system diagram of a loading operation vehicle disclosed in the publication mentioned above, and a description will be given below of a prior art with reference to FIG. 4.

An output of an engine 1 is transmitted to a torque converter 2 and a gear unit 3, and the output transmitted to the gear unit 3 drives fixed capacity hydraulic pumps 4 and 5.

An electronically controlled type governor 7 capable of selecting the output characteristic of the engine 1 step by step on the basis of the output signal of a governor controller 6 is attached to the engine 1. The governor controller 6 controls the electronically controlled type governor 7 on the basis of a mode selecting signal from an operating switch 8.

The hydraulic pumps 4 and 5 are connected to a bucket main operating valve 10 and a boom main operating valve 11. These working machine operating valves 10 and 11 respectively drive a bucket cylinder 15 and a boom cylinder 14 in accordance with an operation of a bucket operation pilot valve 12 and a boom operation pilot valve 13.

A main unload valve 16 is provided in a discharge side of the hydraulic pump 4. A pilot unload valve 17 and an electromagnetically switched type pilot cut-off valve 18 are connected to a pilot side of the main unload valve 16.

A discharge side circuit of the hydraulic pump 5 is connected to the pilot side of the pilot unload valve 17 and is opened and closed due to a discharge pressure thereof. Further, the pilot cut-off valve 18 can freely open and close on the basis of an electric signal from a cut-off valve controller 19.

When setting the operating switch 8 to a mode 1, the governor controller 6 outputs a command to the cut-off valve controller 19 so as to close the pilot cut-off valve 18. Accordingly, the main unload valve 16 is opened and closed only on the basis of the discharge pressure of the hydraulic pump 5.

That is, when the discharge pressure of the hydraulic pump 5 is low, the pilot unload valve 17 is closed, the main unload valve 16 is closed and a discharge fluid of the hydraulic pumps 4 and 5 flows through the cylinders 14 and 15. Further, when the discharge pressure of the hydraulic pump 5 is high, the main unload valve 16 is opened and the discharge fluid in the hydraulic pump 4 is unloaded.

Further, when setting the operating switch 8 to a mode 2, the governor controller 6 outputs a signal to the electronically controlled type governor 7 so as to set the output characteristic of the engine 1 so that the output torque is lower with respect to the same rotational number. At this time, in order to open the pilot cut-off valve 18 at an excavating operation time, the main unload valve 16 is opened and the discharge fluid in the hydraulic pump 4 is unloaded.

Further, in the case of setting the operating switch 8 to a mode 3, the output torque of the engine 1 at the same engine rotational number is further lowered and the pilot cut-off valve 18 is always opened in accordance with a signal from the cut-off valve controller 19, whereby the discharge fluid of the hydraulic pump 4 is unloaded.

As mentioned above, in accordance with the conventional art, the specific fuel consumption at the operating time is reduced and operability is improved selectively by a combination between the output characteristic of the engine 1 and the cut-off condition of the hydraulic pump 4 in correspondence to the magnitude of the operation load.

However, there are the following problems in the prior art disclosed in Japanese Patent Publication No. 7-103593.

For example, in the case of an operation of throwing a subject mounted in a bucket 20 to a crusher (not shown) or the like provided apart therefrom, it is necessary that the loading operation vehicle travels far away, so that the travel operation occupies a large percentage of all of the operation. Accordingly, since an amount of fuel consumption required for traveling occupies a large percentage of all of the amount of fuel consumption for the operation, it is required to reduce the amount of fuel consumption for the travel operation.

Further, since an operating time for traveling is increased, it is required to improve a driving characteristic during a traveling time and to reduce noise.

On the contrary, the conventional art relates to the structure for effectively loading and excavating and does not solve the problem of reducing the specific fuel consumption during the traveling time. Accordingly, in the case of the operation in which the traveling time is long, there is a problem that the total specific fuel consumption is not improved so much.

Further, the conventional art does not solve the problems of improving the characteristic during the traveling time and reducing noise, and no countermeasure against the requirement mentioned above is applied.

SUMMARY OF THE INVENTION

The present invention is made by taking the problem mentioned above into consideration, and an object of the present invention is to provide a loading operation vehicle which can reduce a specific fuel consumption during a traveling time and improve operability including a driving characteristic.

In order to achieve the object mentioned above, in accordance with a first aspect of the present invention, there is provided a loading operation vehicle comprising:

output characteristic changing means for changing an output characteristic of an engine in a plurality of stages;

shift timing changing means for changing a shift timing of an automatic transmission in a plurality of stages;

working machine flow amount changing means for changing a working machine flow amount of a pressurized oil flowing through a working machine actuator in a plurality of stages;

mode setting means for combining the output characteristic of the engine, the shift timing of the automatic transmission and the set value of the working machine flow amount with each other so as to set a plurality of modes; and mode selecting means for freely selecting from the modes.

In accordance with the first aspect, there are provided a plurality of modes obtained by changing the output characteristic of the engine, the shift timing of the automatic transmission and the working machine flow amount step by step and combining them, and an operator can freely select the modes.

Accordingly, it is possible to select the combination of the output characteristic of the engine, the shift timing and the working machine flow amount in correspondence to a magnitude of a load, a traveling speed and a working speed. That is, it is possible to increase a working amount and perform a heavy load operation, and in the case that the operation is not a very heavy load operation and the operation is not required to be rapidly performed, it is possible to reduce a specific fuel consumption.

For example, by selecting so that the output characteristic of the engine is a characteristic having a high torque and a high rotation in the case that the load is heavy and selecting in an inverse manner in the case of a low load, the operation can be performed at a proper engine output, so that a wasteful fuel consumption is reduced and a specific fuel consumption can be improved.

Further, by changing the shift timing of the automatic transmission, it is possible to reduce the specific fuel consumption not only at a time of excavating and loading operation but also at a time of traveling. For example, if the structure is made such that a shift-up operation is performed at a delayed timing in the case that an acceleration during a time of traveling is required, a rapid acceleration can be performed, so that the operation can be rapidly performed and a follow-up performance of the vehicle with respect to an accelerating work of the operator can be improved. Further, if the structure is made such that the shift-up operation is performed at an early timing, the specific fuel consumption during the time of traveling is reduced and the sound during the time of traveling is reduced.

Further, by selecting the working machine flow amount of the pressurized fluid flowing through the working machine actuator, it is possible to perform the operation at a proper working machine flow amount in correspondence to a required operation speed, so that the specific fuel consumption at a time of operating is improved. For example, in the case of reducing the working time, the working machine flow amount is increased, and in the case that the operation may be slowly performed, the working machine flow amount is reduced, whereby the specific fuel consumption is further reduced.

In accordance with a second aspect of the present invention, there is provided a loading operation vehicle as recited in the first aspect of the present invention, further comprising a mode (H1, H2) in which a working amount at a unit time is preferential and a mode (L1, L2) in which a specific fuel consumption reduction is preferential.

In accordance with the second aspect, when selecting the mode attaching importance to the working amount in the selectable modes described in the first aspect, it is possible to put on a heavy load and the operation can be finished for a short time, so that productivity can be improved.

On the contrary, at a time of operating under a light load and in the case that the working time reduction is not considered to be important, the specific fuel consumption can be reduced by selecting the mode attaching importance to the specific fuel consumption, so that an economical efficiency can be improved. Since objects of the respective modes can be clearly understood, the operator can easily select.

In accordance with a third aspect of the present invention, there is provided a loading operation vehicle as recited in the second aspect, wherein an intermediate mode (S1, S2) suitable for a normal operation is provided between the mode in which the working amount at the unit time is preferential and the mode in which the specific fuel consumption reduction is preferential.

In accordance with the third aspect, since the intermediate mode suitable for the normal operation is provided in addition to the selectable two modes described in the second aspect, it is possible to select in a finer manner, so that the specific fuel consumption can be further reduced and the operability can be further improved.

In accordance with a fourth aspect of the present invention, there is provided a loading operation vehicle as recited in the first aspect, wherein the output characteristic changing means is an electronic governor for controlling a fuel injection so as to change the output characteristic of the engine in a plurality of stages in accordance with a command of the mode setting means.

Further, in accordance with a fifth aspect of the present invention, there is provided a loading operation vehicle as recited in the first aspect, wherein the output characteristic changing means is an accelerator cylinder for controlling a maximum pedaling angle of an accelerator pedal so as to change the output characteristic of the engine in a plurality of stages in accordance with a command of the mode setting means.

In accordance with the fourth aspect, since the output characteristic changing means is particularly set to the electronic governor for controlling the fuel injection, the operations and effects as described in the first aspect can be obtained.

In accordance with the fifth aspect, since the output characteristic changing means is set to the accelerator cylinder for controlling the maximum pedaling angle of the accelerator pedal, it is possible to control the engine output only by a hydraulic circuit without using a complex electronic circuit such as an electronic governor or the like and no undesirable torque is generated, so that the specific fuel consumption can be further reduced.

In accordance with a sixth aspect of the present invention, there is provided a loading operation vehicle as recited in the first aspect, wherein the working machine flow amount changing means is a cut-off circuit for unloading a discharge fluid in a switching pump so as to change the working machine flow amount of the pressurized fluid flowing through the working machine actuator in a plurality of stages in accordance with a command of the mode setting means.

Further, in accordance with a seventh aspect of the prevent invention, there is provided a loading operation vehicle as recited in the first aspect, wherein the working machine flow amount changing means is a capacity changing circuit for changing a capacity of a variable working machine pump so as to change the working machine flow amount of the pressurized fluid flowing through the working machine actuator in a plurality of stages in accordance with a command of the mode setting means.

In accordance with the sixth aspect, since the working machine flow amount changing means is particularly set to the cut-off circuit for unloading the discharge fluid in the switching pump, the operations and effects as describe in the first aspect can be obtained.

In accordance with the seventh aspect, since the working machine flow amount changing means is set to the capacity changing circuit for changing the capacity of the variable working machine pump, the switching pump is not required.

Further, since it is possible to set a fine capacity by changing an angle of the swash plate of the variable working machine pump, it is possible to further reduce a specific fuel ratio and further improve operability.

BEST MODE FOR CARRYING OUT THE INVENTION

A description will be given in detail of best embodiments in accordance with the present invention with reference to the accompanying drawings. In this case, the same reference numerals are attached to the same elements as those in FIG. 4 used for explaining the conventional art, and an overlapping description will be omitted.

Figure 1:
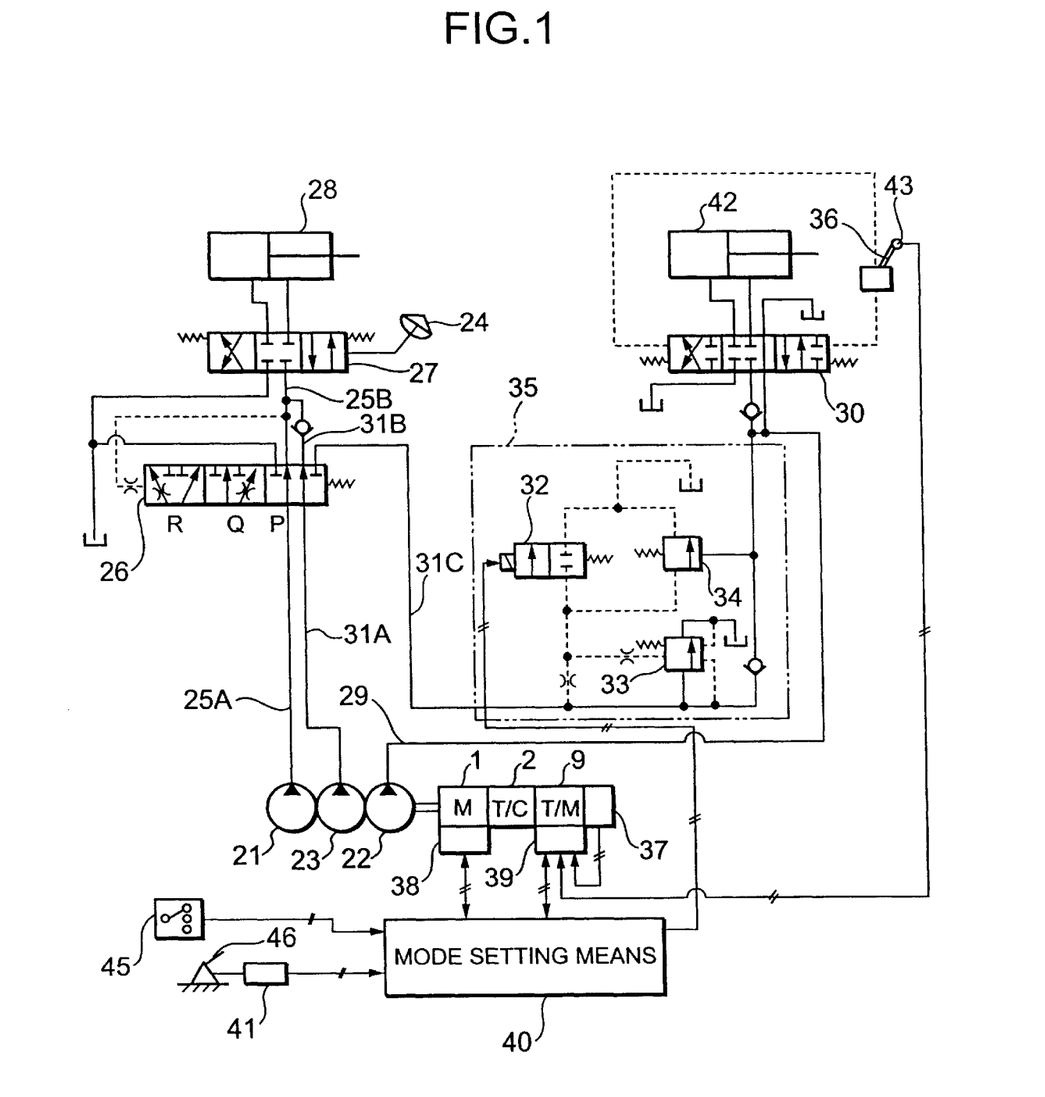
FIG. 1 is a control block diagram at an operating time and a traveling of a wheel loader in accordance with a first embodiment of the present invention.

FIG. 1 is a control block diagram of a loading operation vehicle (hereinafter represented by a wheel loader) in accordance with a first embodiment. In this case, in the following description, a working machine cylinder 42 is representative of a working machine actuator such as a boom cylinder, a bucket cylinder, an attachment cylinder or the like.

In FIG. 1, an automatic transmission 9.(hereinafter referred to as a transmission 9) is connected to an engine 1 of the wheel loader via a torque converter 2. Further, a steering pump 21, for driving a steering actuator, a working machine pump 22, for driving the working machine, and a switching pump 23, freely connected to any one of the steering actuator and the working machine, are connected to the engine 1.

A switching valve 26 is connected to a discharge side of the steering pump 21 via a first steering circuit 25A, and a steering operating valve 27 is connected to a downstream side thereof via a second steering circuit 25B. A steering cylinder 28 for driving the steering is connected to a downstream side of the steering operating valve 27. A discharge pressure of the steering pump 21 is connected to a pilot side of the switching valve 26.

A working machine operating valve 30 is connected to a discharge side of the working machine pump 22 via a working machine circuit 29, and a working machine cylinder 42 for driving the working machine is connected to a downstream side of the working machine operating valve 30.

A discharge side of the switching pump 23 is connected to the switching valve 26 via a first switching circuit 31A. A downstream side of the switching valve 26 is connected to a second steering circuit 25B via a second switching circuit 31B, and is connected to the working machine circuit 29 via a third switching circuit 31C. Further, a cut-off circuit 35, having a cut-off solenoid valve 32, a cut-off valve 33 and a pilot valve 34, is interposed in the third switching circuit 31C.

The steering operating valve 27 is driven in accordance with an operation of a steering handle 24 and the working machine operating valve 30 is driven in accordance with an operation of a working machine lever 36.

A control unit of the wheel loader is provided with mode setting means 40 (hereinafter referred to as a controller 40), and a pedaling angle detector 41 for detecting a pedaling angle of an accelerator pedal 46 is connected to the controller 40. The controller 40 receives a signal from the pedaling angle detector 41 so as to detect the pedaling angle of the accelerator pedal 46.

Output characteristic, changing means 38 (hereinafter referred to as an electronic governor 38), for controlling a fuel injection, is provided in the engine 1. The electronic governor 38 is electrically connected to the controller 40 so as to input and output a signal to each other, thereby being capable of changing the output characteristic of the engine 1 on the basis of a command of the controller 40.

Figure 2:
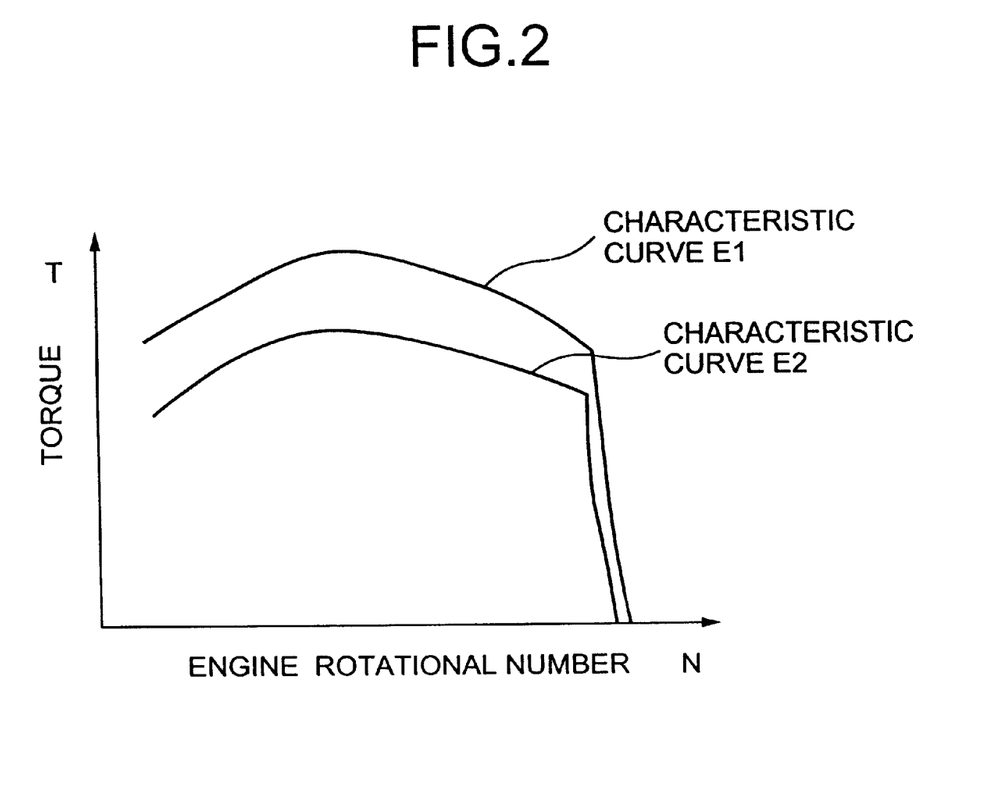
FIG. 2 is a view showing a characteristic curve of an engine shown in FIG. 1.

In FIG. 2, a horizontal axis corresponds to a rotational number N of the engine 1, a vertical axis corresponds to a torque T, and each of curves E1 and E2 shows a characteristic curve of the engine 1.

In particular, the curve E1 shows an inherent output characteristic of the engine 1. The curve E2 shows an output characteristic in the case that a control with respect to the electronic governor 38 from the controller 40 is performed so as to reduce the torque of the engine 1 at the same rotational number.

In FIG. 1, the transmission 9 is provided with shift timing changing means 39 (hereinafter referred to as a transmission controller 39) for controlling a shift stage. The transmission controller 39 is connected to the controller 40 so as to input and output a signal to each other, and determines a shift timing of the transmission 9 on the basis of a command from the controller 40.

That is, the transmission 9 is structured such as to shift up from a second speed to a third speed when a vehicle speed becomes equal to or more than a vehicle speed V1. The timing of this shift-up operation can be set such as to be shifted up in accordance with the command from the controller 40, for example, when the vehicle speed becomes equal to or more than a vehicle speed V2 (V1>V2). Of course, in addition to the shift-up operation from the second speed to the third speed, a timing in shift-up operations of the other shift stages or a shift-down operation can be also realized.

Further, the cut-off solenoid valve 32 within the working machine flow amount changing means 35 (hereinafter referred to as a cut-off circuit 35) is electrically connected to the controller 40, and the cut-off solenoid valve 32 is opened and closed in accordance with an output signal from the controller 40.

A vehicle speed detector 37 for detecting a speed of the vehicle is connected to the transmission controller 39 so as to control the shift stage of the transmission 9 on the basis of the detected vehicle speed.

Further, a kick-down switch 43 is attached to a lever upper portion in the working machine lever 36. The kick-down switch 43 is electrically connected to the transmission controller 39, and when pressing the switch, the shift stage of the transmission 9 becomes forcibly a first speed. Further, when again pressing the switch, the shift stage of the transmission 9 is returned to an original position.

Next, a description will be given of an operation of a hydraulic circuit in the wheel loader structured in the manner mentioned above.

Since the discharge amount of the steering pump 21 is small while the rotational number of the engine 1 is low, the switching valve 26 is at its position P in FIG. 1. At this time, since the discharge fluid in the steering pump 21 and the discharge fluid in the switching pump 23 both flow through the second steering circuit 25B, the steering flow amount flowing to the steering cylinder 28 through the steering operating valve 27 becomes large. That is, a great steering operation can be obtained by a little operation of the steering handle 24.

When the rotational number of the engine 1 is increased, the discharge amount of the steering pump 21 is increased, and the switching valve 26 moves to its position Q in FIG. 1. Accordingly, since the discharge fluid in the switching pump 23 flows to the third switching circuit 31C, the pressurized fluid flowing through the second steering circuit 25B is constituted only by the discharge fluid from the steering pump 21, so that the steering flow amount is reduced. Therefore, the steering operation with respect to the operation of the steering handle 24 is reduced, so that a stability, for example, at a time of high speed driving can be improved.

In this case, when the discharge amount of the steering pump 21 is further increased, the switching valve 26 moves to its position R, so that the discharge fluid in the steering pump 21 is unloaded. At this time, the discharge fluid in the switching pump 23 flows through the third switching circuit 31C in the same manner as that of the position Q.

On the contrary, in the working machine circuit 29, as mentioned above, only the discharge fluid from the working machine pump 22 flows through the working machine circuit 29 while the rotational number of the engine 1 is low, so that the working machine flow amount flowing through the working machine cylinder 42 is reduced. Further, when the switching valve 26 moves to its position Q together with an increase of the rotational number of the engine 1, the discharge fluid in the switching pump 23 is combined with the working machine circuit 29 through the third switching circuit 31C.

The cut-off circuit 35 is interposed in the third switching circuit 31C. An operation of the cut-off circuit 35 is as follows.

In the case that the electric signal is not output to the cut-off solenoid valve 32 from the controller 40, the cut-off solenoid valve 32 is closed.

At this time, in the case that the discharge pressure of the working machine pump 22 is equal to or less than a predetermined pressure, the pilot valve 34 is closed. Accordingly, since the discharge fluid in the switching pump 23 is evenly applied to a pilot side of the cut-off valve 33 and a spring chamber side thereof, the cut-off valve 33 is also closed. Therefore, since the discharge fluid in the switching pump 23 flows through the working machine circuit 29 so as to be combined with the discharge fluid in the working machine pump 22, thereby driving the working machine cylinder 42, the working machine flow amount is increased and the drive speed of the working machine cylinder 42 is increased.

Further, in the case that the discharge pressure of the working machine pump 22 is over a predetermined pressure, the pilot valve 34 is opened. Accordingly, since the discharge fluid in the switching pump 23 applied to the spring chamber side of the cut-off valve 33 is unloaded through the pilot valve 34, the cut-off valve 33 is opened. Therefore, the discharge fluid in the switching pump 23 is unloaded through the cut-off valve 33 and the pressurized fluid flowing through the working machine cylinder 42 only contains the discharge fluid from the working machine pump 22.

As mentioned above, a set condition of unloading the discharge fluid in the switching pump 23 in the case that the discharge pressure in the working machine pump 22 becomes equal to or more than a predetermined value by normally flowing the discharge fluid in the switching pump 23 to the working machine cylinder 42 is called as "partial cut-off".

Further, it is possible to always unload the discharge fluid from the switching pump 23 flowing through the third switching circuit 31C so as not to flow through the working machine cylinder 42, and this type of set condition is called as "full cut-off".

In this case, the controller 40 outputs an electric signal to the cut-off solenoid valve 32 so as to open the cut-off solenoid valve 32. In accordance therewith, the discharge fluid from the switching pump 23 applied to the spring chamber side of the cut-off valve 33 is unloaded through the cut-off solenoid valve 32. Accordingly, since the cut-off valve 33 is opened, the discharge fluid in the switching pump 23 is unloaded through the cut-off valve 33, and the pressurized fluid flowing through the working machine cylinder 42 is constituted only by the discharge fluid from the working machine pump 22.

As mentioned above, the controller 40 sets a so-called cut-off driving condition on how to perform the cut-off operation of the discharge fluid from the switching pump 23 so as to set the working machine flow amount by outputting the signal to the cut-off solenoid valve 32.

Next, a description will be given of each of the modes at a time of driving the wheel loader and an operation of the controller 40 for setting them.

Mode selecting means 45 (hereinafter referred to as a mode switch 45) for selecting a mode when the operator drives the wheel loader is connected to the controller 40. In accordance with the present embodiment, it is possible to select three modes comprising H1, S1 and L1.

When the operator selects any one mode among the modes H1, S1 and L1 by the mode switch 45, the controller 40 outputs a command to the electronic governor 38, the cut-off solenoid valve 32 and the transmission controller 39. In accordance with the command, an engine output characteristic, a timing of shift change and a cut-off condition of the switching pump 23, that is, the working machine flow amount, are set on the basis of the predetermined combination.

Table 1 shows combinations among the engine output characteristic, the timing of the shift change and the working machine flow amount at a time of selecting each of the modes comprising H1, S1 and L1 by the mode switch 45.

TABLE 1

| Mode | H1 | S1 | L1 |
|---|---|---|---|
| Engine output characteristic | Curve E1 | Curve E1 | Curve E2 |
| Timing of shift change | Shift up at vehicle speed V1 | Shift up at vehicle speed V2 | Shift up at vehicle speed V2 |
| Working machine flow amount | Partial cut-off | Full cut-off | Full cut-off |

At first, a description will be given of a case that the mode is H1.

The controller 40 outputs a signal to the electronic governor 38 so as to control the engine 1 so that the output characteristic of the engine 1 becomes an inherent curve E1. Further, the controller 40 outputs a signal to the transmission controller 39 so as to set so that the shift-up operation from the second speed to the third speed is performed at a high vehicle speed V1.

Further, at this time, the controller 40 outputs a signal to the cut-off solenoid valve 32 so as to set so that the cut-off operation condition becomes "partial cut-off".

In the H1 mode mentioned above, since the output characteristic of the engine 1 has a high torque, a strong power can be obtained during a working time and a traveling time, so that a heavy load operation can be performed. Further, since the structure is made such as not to perform a shift-up operation from the second speed to the third speed until a high speed, an acceleration during a traveling time is great, the traveling speed is increased, and a response to an accelerator work is improved, so that an energetic travel can be performed.

Further, since the structure is made such that the discharge fluid in the switching pump 23 flows through the working machine cylinder 42 until a certain predetermined pressure, the working machine flow amount is increased and the working machine cylinder 42 is fast driven, so that a time required for the operation such as the loading operation or the like can be reduced.

That is, the mode H1 is frequently selected in the case that the working amount per unit time is preferential in comparison with the specific fuel consumption and the case of the heavy load.

Next, a description will be given of a case that the mode is S1. In this mode, the output characteristic of the engine 1 is the same as the mode H1, however, the timing of the shift change is set to a time when the vehicle speed V2 is lower than the vehicle speed V1 (V1>V2). Accordingly, since the shift-up operation is earlier performed during an accelerating time, the specific fuel consumption during the traveling time is reduced and the sound is reduced.

Further, since the cut-off operation of the switching pump 23 is set to "full cut-off", the switching pump 23 is always unloaded during a time of high rotation of the engine 1, the discharge fluid does not flow through the working machine circuit 29, and the working machine flow amount is reduced. Accordingly, since the working machine flow amount is reduced although the speed for driving the working machine cylinder 42 is reduced, the amount of fuel consumption during a time of operation such as the loading operation or the like is reduced and the specific fuel consumption is reduced.

That is, the mode S1 is frequently selected in order to reduce the specific fuel consumption in the operation under a normal load.

Next, a description will be given of a case that the mode is L1. In this mode, the timing of the shift change and the working machine flow amount are the same as those in the case of S1, however, the output characteristic of the engine 1 is set to a low output characteristic of the curve E2.

Accordingly, even when the accelerator is pedaled down in the same manner as that in the case of the modes H1 and S1, the torque of the engine 1 is restricted to a low level, so that the engine is not excessively raced during a light work and the specific fuel consumption is reduced. Further, the specific fuel consumption required for traveling can be reduced for the same reason.

Further, since the structure is made such that the work is performed in a state of pedaling the accelerator part of the way so as not to excessively race the engine, in the case of a conventional light work, it is hard to keep the pedal of the accelerator at a fixed strength. In this L1 mode, since the engine 1 is not excessively raced even when the accelerator is full pedaled, by changing the characteristic of the engine 1, it is possible to perform the work while pedaling the accelerator to a final position even in the light work, and operability can be improved.

As mentioned above, the mode L1 is frequently selected in the case of particularly requiring a reduction of specific fuel consumption in the light work.

As mentioned above, in accordance with the present embodiment, the output characteristic of the engine 1, the shift timing of the transmission 9 and the working machine flow amount are set to be changeable, a plurality of set stages is respectively provided therein, and a plurality of modes H1, S1 and L1, obtained by combining them, is provided. The operator can freely select the mode from these modes in correspondence to the magnitude of the work load, the traveling speed or the necessary work speed.

Accordingly, it is possible to select the combination among the output characteristic of the engine 1, the shift timing and the working machine flow amount in correspondence to the magnitude of the load, the traveling speed and the work speed. That is, it is possible to increase the work amount and perform a heavy load work, and further it is possible to reduce the specific fuel consumption in the case that the work is not so much heavy and is not required to be quickly performed.

For example, the work can be performed at a suitable engine output by selecting the mode so that the output characteristic of the engine 1 has a high torque and a high rotation in the case that the load is heavy and by inversely selecting in the case that the load is light, respectively, so that a wasteful fuel consumption can be reduced and the specific fuel consumption can be improved.

Further, by changing the shift timing of the transmission 9, it is possible to reduce the amount of fuel consumption not only during the excavating time and the loading operation time but also during the traveling time. For example, in the case that the acceleration during the traveling time is required, a rapid acceleration can be performed by shifting up at a delayed timing, so that the work can be rapidly performed, and the follow-up performance with respect to the acceleration work of the operator can be improved. Further, when the structure is made such that the shift-up operation is performed at an early timing, the specific fuel consumption during the traveling time can be reduced and the sound during the traveling time can be reduced.

Further, it is possible to perform an operation at a suitable working machine flow amount in correspondence to a necessary work speed by selecting the working machine flow amount of the pressurized fluid flowing through the working machine cylinder 42, whereby the specific fuel consumption during the operating time is improved. For example, in the case of reducing the work time, the working machine flow amount is increased, and in the case that the work may be slowly performed, the working machine flow amount is reduced, whereby the specific fuel consumption is further reduced.

In addition, there are provided the mode H1, in which the work amount per the unit time is preferential, and the mode L1, in which the specific fuel consumption is made important, as the modes.

When selecting the mode H1 in which the work amount per the unit time is preferential, it is possible to perform a heavy load work. Further, since the work can be finished in a short time, productivity can be improved, and since the acceleration during the traveling time is increased, the travel is energetically performed. As mentioned above, since the work amount per unit time is increased, productivity is improved. Further, when selecting the mode S1 in which the specific fuel consumption is made important, a wasteful fuel consumption is reduced and the specific fuel consumption is improved, so that an economical efficiency is improved.

As mentioned above, the operator can easily select the mode by setting each of the modes H1 and L1 in accordance with the object. Here, for example, when the mode S1 is provided in the middle of each of-the modes H1 and L1, a finer selection can be performed, and it is possible to reduce the specific fuel consumption and improve operability. The normal work is preferably performed in the intermediate mode S1 mentioned above.

In this case, the cut-off operation condition of the switching pump 23 may be performed as follows.

In the modes S1 and L1, the "partial cut-off" is normally set. Further, only in the case that the kick-down switch 43 attached to the upper portion of the working machine lever 36 is pressed and the shift stage is set to a first speed, a signal is output to the cut-off solenoid valve 32 so as to forcibly unload the switching pump 23.

That is, in the case where the pressure of the switching pump 23 is low such as a work of lifting up the load and a lot of working machine flow amount is required, the discharge fluid of the switching pump 23 flows through the working machine cylinder 42, so that it is possible to quickly lift up the load. On the contrary, in the case where the working machine flow amount is small such as an excavating operation and a propelling force of a vehicle body is required, the discharge fluid in the switching pump 23 is unloaded, so that the output of the engine 1 is much distributed due to the drive force of the transmission 9 and a great propelling force can be obtained.

Accordingly, since the working machine is normally operated as a light work and can resist against a heavy load operation only at the excavating operation, it is possible to more efficiently perform the work without wastefully using the power of the engine 1.

Next, a description will be given of a second embodiment in accordance with the present invention.

Figure 3:
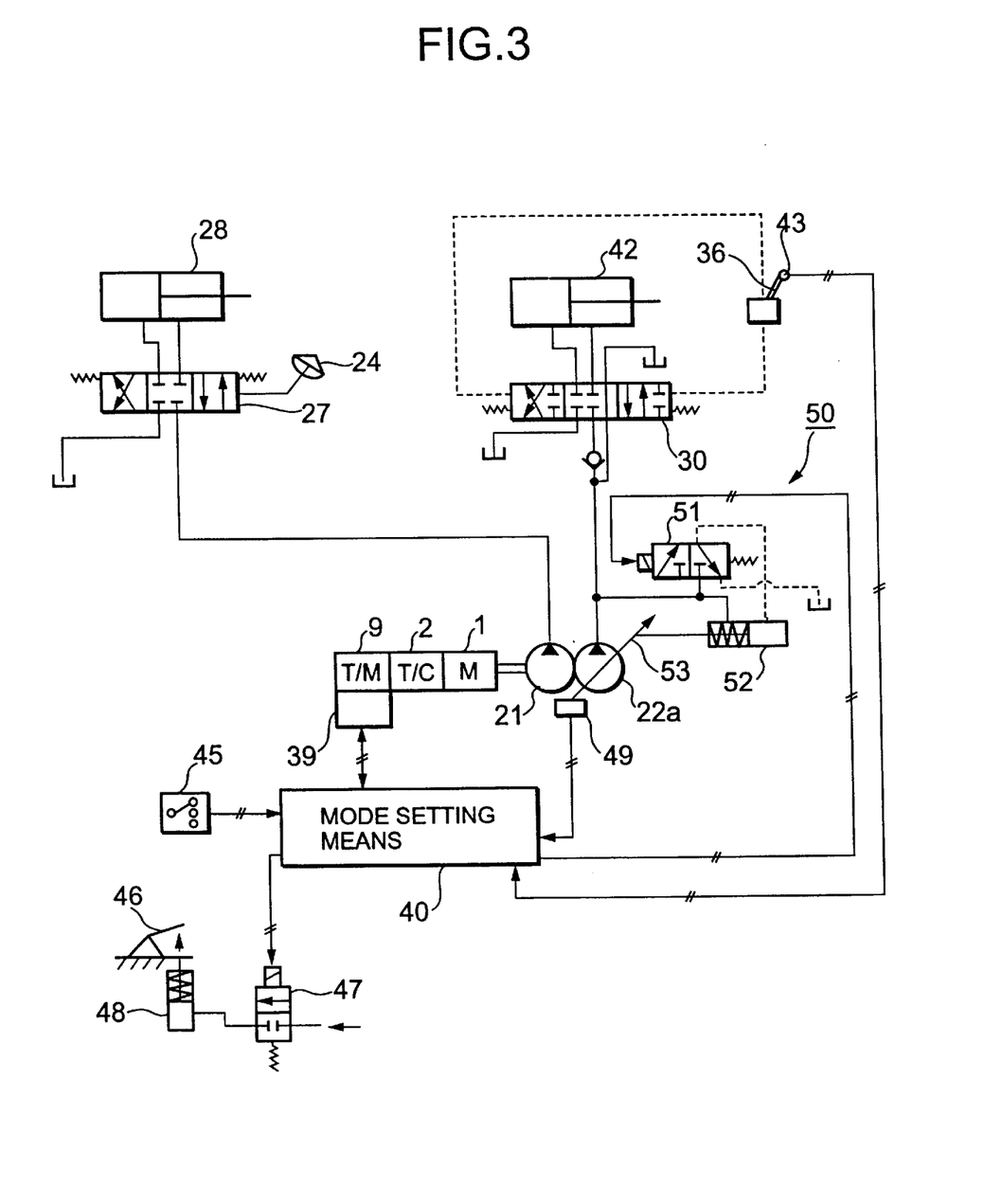
FIG. 3 is a control block diagram at an operating time and a traveling time of a wheel loader in accordance with a second embodiment of the present invention.

FIG. 3 is a control block diagram of a loading operation vehicle (hereinafter, represented by a wheel loader) in accordance with a second embodiment. In this case, the same reference numerals are attached to the same elements as those in FIG. 1 described with respect to the first embodiment, and an overlapping description will be omitted.

In FIG. 3, output characteristic changing means 48 (hereinafter referred to as an acceleration cylinder 48) driven by an acceleration solenoid valve 47 is provided in a floor portion to which the acceleration pedal 46 is grounded, in such a manner as to freely protrude to a lower portion of the acceleration pedal 46. The acceleration solenoid valve 47 is electrically connected to the controller 40. When the acceleration solenoid valve 47 is opened on the basis of the command of the controller 40, the pressurized fluid is supplied to the bottom side of the accelerator cylinder 48 from a hydraulic source (not shown), whereby the accelerator cylinder 48 protrudes. When the accelerator cylinder 48 protrudes, the accelerator pedal 46 can not be pedaled down over the acceleration cylinder 48 even in the case where the operator fully pedals down the accelerator pedal 46, whereby the maximum rotational number of the engine 1 is reduced.

That is, the controller 40 can freely set the maximum rotational number of the engine 1 in two stages between high and low in accordance with a signal output to the acceleration solenoid valve 47.

Further, the steering pump 21 and a variable working machine pump 22a having a variable capacity are connected to the engine 1. A capacity detector 49 for detecting a capacity is attached to the variable working machine pump 22a. The capacity detector 49 is electrically connected to the controller 40, and the controller 40 can detect a capacity of the variable working machine pump 22a.

Further, working machine flow amount changing means 50 (hereinafter referred to as a capacity changing circuit 50) for changing a capacity thereof is attached to the variable working machine pump 22a. The capacity changing circuit 50 is provided with a capacity solenoid valve 51 electrically connected to the controller 40, and a capacity cylinder 52 driven due to a pilot pressure of the capacity solenoid valve 51

When the capacity solenoid valve 51 is closed, the movable working machine pump 22a always discharges a pressurized fluid at a fixed large capacity.

Further, when a command signal is output to the solenoid valve 51 from the controller 40, the capacity solenoid valve 51 is opened, and a pilot pressure is applied to the capacity cylinder 52. Then, the capacity cylinder 52 is extended so as to change an angle of a swash plate 53 in the variable working machine pump 22a so that a discharge amount of the variable working machine pump 22a is reduced. Accordingly, the larger the rotational number of the engine 1, that is, the rotational number of the variable working machine pump 22a is, the smaller the capacity of the variable working machine pump 22a is, whereby the working machine flow amount is reduced.

Table 2 shows combinations among the output characteristic of the engine 1, the timing of the shift change and the working machine flow amount at a time of selecting each of the modes comprising H2, S2 and L2 by the mode switch 45.

TABLE 2

| Mode | H2 | S2 | L2 |
| --- | --- | --- | --- |
| Engine output characteristic | Maximum rotational number high | Maximum rotational number high | Maximum rotational number low |
| Timing of shift change | Shift up at vehicle speed V1 | Shift up at vehicle speed V2 | Shift up at vehicle speed V2 |
| Working machine flow amount | Large capacity | Small capacity (variable) | Small capacity (variable) |

In the case that the mode is H2, since the maximum rotational number of the engine 1 is a high rotation, a great torque is generated when fully pedaling the accelerator pedal 46, whereby the work with respect to the heavy load can be performed. Further, the timing of the shift change in Table 2 is the same in the first embodiment so as not to perform the shift-up operation from the second speed to the third speed until becoming a high speed. Accordingly, the acceleration during the traveling time is increased, the traveling speed is increased, and the response to the acceleration work is improved, so that an energetic travel can be performed.

Further, since the capacity of the variable working machine pump 22a is set to be a large capacity, the speed for driving the working machine cylinder 42 is large, so that the work can be rapidly performed.

That is, the mode H2 is frequently selected in the case of the heavy load and the case where the work amount per unit of time is preferential in comparison with the specific fuel consumption, in the same manner as that in the mode H1.

Further, since the modes S2 and L2 are respectively the same operations as the modes S1 and L1 and the working machine flow amount is reduced in each of the cases, the specific fuel consumption is preferential. Further, the mode L2 controls the maximum rotational number of the engine 1 and corresponds to a mode in which the specific fuel consumption is made important.

As mentioned above, in accordance with the present embodiment, the maximum rotational number of the engine 1 is made variable by restricting the maximum pedaling angle of the accelerator pedal 46 to a smaller value. Accordingly, since it is possible to control the power of the engine 1 in accordance with the hydraulic circuit without using a complex electronic circuit such as the electronic governor 38 or the like and an unnecessary torque is not generated, a low specific fuel consumption can be realized.

Further, since the specific fuel consumption is reduced by controlling the maximum pedaling angle of the accelerator pedal 46, the output characteristic of the engine 1 during a time of pedaling the accelerator pedal 46 part of the way does not change in each of the modes H2, L2 and S2. Accordingly, since the same torque is output with respect to the same pedaling angle in every mode, the operator can be easily skilled in the engine characteristic, for example, can easily adjust a torque in accordance with an adjustment of the pedaling angle.

Further, since the working machine pump 22a is set to be a capacity variable type and the working machine flow amount is changed by the mode switch 45, the switching pump 23 in the first embodiment is not required. Further, since it is possible to change an angle of the swash plate 53 so as to change the working machine flow amount, it is possible to adjust in a multiplicity of stages in addition to two stages comprising large and small as mentioned above. That is, since the number of choices is increased in correspondence to the contents of the work, a fine capacity control can be performed, the specific fuel consumption can be more effectively reduced and operability can be improved.

In the description of the present embodiment, the output characteristic of the engine 1 is set to two ways and is switched to any one thereof; however, the setting is not limited to two ways and more settings may be provided. Further, with respect to the timing of the shift change, the structure is made such that only the vehicle speeds V1 and V2 at a time of shifting up from the second speed to the third speed are changed; however, the timing of the shift-down may be changed in the same manner, or the setting with respect to the other shift stages such as the setting from the first speed to the second speed or the like may be provided.

In addition, the mode to be selected is not limited to three modes comprising H2, S2 and L2, and may be two modes or four modes or more.

What is claimed is:

1. A loading operation vehicle comprising:

output characteristic changing means for changing an output characteristic of an engine in a plurality of stages;

shift timing changing means for changing a shift timing of an automatic transmission in a plurality of stages;

working machine flow amount changing means for changing a working machine flow amount of a pressurized oil flowing through a working machine actuator in a plurality of stages;

mode setting means for combining the output characteristic of the engine, the shift timing of the automatic transmission and the set value of the working machine flow amount with each other so as to set a plurality of modes; and mode selecting means for freely selecting from the modes, so that a specific fuel consumption is reduced and an operability is improved even when the vehicle is traveling.

2. A loading operation vehicle as claimed in claim 1, wherein said plurality of modes is provided with a mode (H1, H2) in which a working amount per unit time is preferential and a mode (L1, L2) in which a specific fuel consumption reduction is preferential.

3. A loading operation vehicle as claimed in claim 2, wherein an intermediate mode (S1, S2) suitable for a normal operation is provided between said mode in which the working amount per unit time is preferential and said mode in which the specific fuel consumption reduction is preferential.

4. A loading operation vehicle as claimed in claim 1, wherein said output characteristic changing means is an electronic governor for controlling fuel injection so as to change the output characteristic of the engine in a plurality of stages in accordance with a command of said mode setting means.

5. A loading operation vehicle as claimed in claim 1, wherein said output characteristic changing means is an accelerator cylinder for controlling a maximum pedaling angle of an accelerator pedal so as to change the output characteristic of the engine in a plurality of stages in accordance with a command of said mode setting means.

6. A loading operation vehicle as claimed in claim 1, wherein said working machine flow amount changing means is a cut-off circuit for unloading discharge fluid from a switching pump so as to change the working machine flow amount of the pressurized fluid flowing through said working machine actuator in a plurality of stages in accordance with a command of said mode setting means.

7. A loading operation vehicle as claimed in claim 1, wherein said working machine flow amount changing means is a capacity changing circuit for changing a capacity of a variable working machine pump so as to change the working machine flow amount of the pressurized fluid flowing through said working machine actuator in a plurality of stages in accordance with a command of said mode setting means.

* * * * *